3,700,409
SPOT TEST FOR IDENTIFICATION OF OIL CONTAMINANTS IN WATER

David M. Zall, Annapolis, Md., assignor to the United States of America as represented by the Secretary of the Navy
No Drawing. Filed Apr. 23, 1971, Ser. No. 137,046
Int. Cl. G01n 21/00
U.S. Cl. 23—230 R                   1 Claim

ABSTRACT OF THE DISCLOSURE

Method of detecting a hydrocarbon contaminant in an aqueous solution by applying chromic-sulfuric acid to filter paper wetted by the aqueous solution. A positive test is indicated by the development of a bluish-green color.

---

The invention described herein may be manufactured and used by or for the Government of the United States of America for Governmental purposes without the payment of any royalties thereon or therefor.

BACKGROUND OF THE INVENTION

In the past it has been common practice among ship owners and particularly among the owners of oil cargo type ships to periodically clean the oil tanks of the ships. This was done by merely washing the empty tanks with sea water and then discharging the water into the surrounding oceans or bays. However, with the increasing difficulty that has been caused by such cleaning due to oil contamination of the waters and associated harm to fish and wild life, many states and countries have passed laws forbidding dumping of contaminated water effluent into the coastal and even the ocean water areas. Thus, it becomes necessary for the owners of ships to test the effluent from their cleaning processes to insure that they are not dumping oil contaminated water back into the sea areas.

FIELD OF INVENTION

The present invention relates to a method of testing the effluent from a ship cleaning process to insure that oil contaminates are not present therein.

DESCRIPTION OF THE PRIOR ART

In the past it has been common practice to use optical test equipment to check the amount of oil in the effluent from a cleaning process. This instrument is expensive and difficult to operate. A trained operator is required and even then the test is difficult to perform. The test is performed as follows: a sample of the effluent is placed in a test cell, light is passed through this cell and a measure of the turbidity of the liquid is made. This measurement is then compared to that obtained from a known clean sample of water. The difference is proportional to the amount of oil contaminant in the effluent. This method suffers from several draw backs, the first is that if a contaminated sample is used the oil in the sample will tend to coat the walls of the test cell thereby requiring a thorough cleaning of the cell after each use. If the cell is not cleaned thoroughly, erroneous results will be obtained from succeeding measurements. Further, these tests are conducted on the spot, i.e., on the ship itself while the cleaning operation is in progress. Thus, the expensive test instrumentation is subject to damage and often is not as accurate as it could be if it were operated under laboratory conditions. Still further, the instrument requires a trained operator who knows how to use the instrument properly, if he is not present the instrument cannot be effectively used by untrained personnel.

OBJECTS OF THE INVENTION

It is an object of this invention to produce a test for oil contaminants in water which does not require expensive instrumentation.

Another object of the invention is to provide a test which can be easily used on the spot, i.e., where the oil cleaning process is taking place.

Another object of the invention is to produce a test which can be performed by an unskilled operator.

Another object of the invention is to produce a test which is more sensitive than the present optical instrument test procedures now in use.

Another object of the invention is to produce a test which is less expensive and more easily usable than the presently used devices.

SUMMARY OF THE INVENTION

The present invention employs the use of a fiber glass filter paper upon which a sample of the contaminated effluent is placed. A drop of chromic-sulfuric acid such as that disclosed in I. M. Kolthoff's "Textbook of Quantitative Inorganic Analysis," page 235, Macmillan Co., New York, 1947, is placed on the sample wetted filter paper. If the sample is contaminated, a bluish-green color results indicating the presence of oil. This test is very simple and can be performed by anyone, the test requires merely filter paper and a bottle of appropriate reagent.

The test of the prior art which involves measuring the turbidity of the contaminated water allows the detection of oil under the best conditions in an amount equal to about 20 parts per million. With the present test, it is possible to detect contaminants in water in the amounts of approximately 8 parts per million or less. Thus, it can be seen that the present test, while considerably simpler, cheaper and capable of being performed by an unskilled operator is more sensitive than the test of the prior art.

The cleaning of the ship tanks is usually done with sea water, thus the optical turbidity test requires a standardization process which is time consuming and difficult. What one must do is measure the turbidity of the sea water before it is used to clean the tanks and compare it to the turbidity of the water after the tanks have been cleaned, thus, two tests instead of one must be taken, since the original sea water used is not perfectly clean. Due to the use of the sea water as the cleaning agent, the sensitivity of the turbidity test is reduced. In the present case, it has been found, quite surprisingly, that the test of the effluent, using chromic-sulfuric acid spot test of the present invention, is actually more sensitive when used with sea water. This can be explained by the fact that when the sea water is at normal ambient temperature the sodium chloride in the effluent acts as a catalyst which more easily causes the reduction of the chromate portion of the acid to a chromite. Because of this catalytic action of the sodium chloride with the chromic-sulfuric acid the present spot test becomes more sensitive in sea water than in clean distilled water. This is the exact opposite of the effect which sea water has on the optical turbidity test equipment presently in use. Hence, it can be seen that the present spot test is a significant advance over the prior art.

If desired, a calibration chart could be made wherein the resulting color from the spot test could be used to determine the quantity of hydrocarbon contaminant contained in the sea water effluent.

Obviously modifications and variations of the present invention are possible in the light of the above teachings. It is therefore to be understood that within the scope of the appended claim the invention may be practiced otherwise than as specifically described.

What is claimed is:

1. A method of detecting the presence of hydrocarbon contaminants in an aqueous solution of sea water possibly contaminated with oil including:

placing the aqueous solution of sea water contaminated with oil on a piece of fiberglass filter paper;

applying to the wetted filter paper a reagent of chromic-sulfuric acid; and observing the color change of the wetted filter paper which indicates the presence of hydrocarbon contaminants.

References Cited

UNITED STATES PATENTS

| | | | |
|---|---|---|---|
| 2,800,460 | 7/1957 | Grosskopf | 252—408 |
| 3,436,188 | 4/1969 | Boyd | 23—230 R |

OTHER REFERENCES

I. M. Kolthoff, "Textbook of Quantitative Inorganic Analysis," 235, 523–524, MacMillan Co., New York, 1947.

R. L. Schriner: "The Systematic Identification of Organic Compounds," 54–55, John Wiley & Sons, New York, 1948.

Chemical Abstracts, 32: 8641 (1938).

F. Feigel: "Chemistry of Specific, Selective and Sensitive Reactions," 59, Academic Press, New York, 1949.

Chemical Abstracts, 69: 21813g (1968).

MORRIS O. WOLK, Primary Examiner

S. MARANTZ, Assistant Examiner

U.S. Cl. X.R.

23—230 HC; 252—408